(12) United States Patent
Stoltzfus et al.

(10) Patent No.: US 9,769,988 B2
(45) Date of Patent: Sep. 26, 2017

(54) LANDSCAPING BORDER SEGMENT

(71) Applicants: Melvin A. Stoltzfus, Rockville, IN (US); Allen Z. Stoltzfus, Carbon, IN (US); Benjamin S. Graber, Grabil, IN (US)

(72) Inventors: Melvin A. Stoltzfus, Rockville, IN (US); Allen Z. Stoltzfus, Carbon, IN (US); Benjamin S. Graber, Grabil, IN (US)

( * ) Notice: Subject to any disclaimer, the term of this patent is extended or adjusted under 35 U.S.C. 154(b) by 505 days.

(21) Appl. No.: 14/580,449

(22) Filed: Dec. 23, 2014

(65) Prior Publication Data

US 2016/0174466 A1 Jun. 23, 2016

(51) Int. Cl.
*A01G 1/08* (2006.01)

(52) U.S. Cl.
CPC .................................. *A01G 1/08* (2013.01)

(58) Field of Classification Search
CPC ............................... A01G 1/08; E01C 11/221
USPC ............ 47/33, 32.4, 32.7, 32.8, 32, 32.6, 9; 52/102; 404/6, 7, 8
See application file for complete search history.

(56) References Cited

U.S. PATENT DOCUMENTS

| | | | | |
|---|---|---|---|---|
| 4,508,319 A * | 4/1985 | Tappan | ............... | E04H 12/2215 256/1 |
| 4,647,491 A * | 3/1987 | Ireland | ..................... | A01G 1/08 428/137 |
| 5,073,061 A * | 12/1991 | Jones | ..................... | E01C 11/221 404/7 |
| 5,157,867 A * | 10/1992 | Fritch | ...................... | A01G 1/08 404/102 |
| 5,212,917 A * | 5/1993 | Kurtz | ....................... | A01G 1/08 404/7 |
| 5,236,179 A * | 8/1993 | Schropp | .................. | A01G 1/08 256/19 |
| 5,377,447 A * | 1/1995 | Fritch | ...................... | A01G 1/08 404/7 |
| 5,544,445 A * | 8/1996 | Mantilla | .................. | A01G 1/08 404/7 |
| 5,941,018 A * | 8/1999 | Herrema | .................. | A01G 1/08 47/33 |
| 6,026,610 A * | 2/2000 | Northrop | ................. | A01G 1/08 47/33 |
| 6,108,969 A * | 8/2000 | Danna | ....................... | A01G 1/08 404/7 |
| 6,625,925 B1 * | 9/2003 | Foster | ...................... | A01G 1/08 47/33 |

(Continued)

FOREIGN PATENT DOCUMENTS

CA 2667630 12/2010

*Primary Examiner* — Trinh Nguyen
(74) *Attorney, Agent, or Firm* — Liell & McNeil

(57) ABSTRACT

A landscaping border segment includes about two dozen rigid unit pieces arranged in a series and held together with top end base elastic joining members. Male and female connection features are mounted at opposite ends of the landscaping border segment. A plurality of ground penetrating stakes extend away from a ground contact surface. The landscaping border segment may assume a straight configuration in which the rigid unit pieces are held apart from one another by the elastic joining members, but may also assume a continuum of curved configurations. A landscaping border may be created by joining a plurality of landscaping border segments end to end in a series.

19 Claims, 3 Drawing Sheets

(56) References Cited

U.S. PATENT DOCUMENTS

| | | | | |
|---|---|---|---|---|
| 6,643,977 B1* | 11/2003 | Drysdale | .................. | A01G 1/08 47/33 |
| 7,478,501 B2* | 1/2009 | Wilbanks, Jr. | ............ | A01G 9/12 47/33 |
| 7,596,903 B1* | 10/2009 | Flanagan | ................. | A01G 1/08 47/33 |
| 2005/0034362 A1* | 2/2005 | Anderson | ................ | A01G 1/08 47/33 |
| 2005/0160686 A1* | 7/2005 | Williams | ................ | A01G 1/08 52/102 |
| 2008/0163566 A1* | 7/2008 | Bella | ..................... | E01C 11/221 52/102 |
| 2010/0186293 A1* | 7/2010 | Flynn | ...................... | A01G 1/08 47/33 |
| 2011/0277395 A1* | 11/2011 | Wink | ....................... | A01G 1/08 52/102 |
| 2012/0174479 A1* | 7/2012 | Leiter | ..................... | A01G 1/08 47/33 |
| 2013/0025194 A1* | 1/2013 | Adam | ..................... | A01G 1/08 47/33 |
| 2015/0250104 A1* | 9/2015 | Birkland | ................. | A01G 1/08 52/102 |

\* cited by examiner

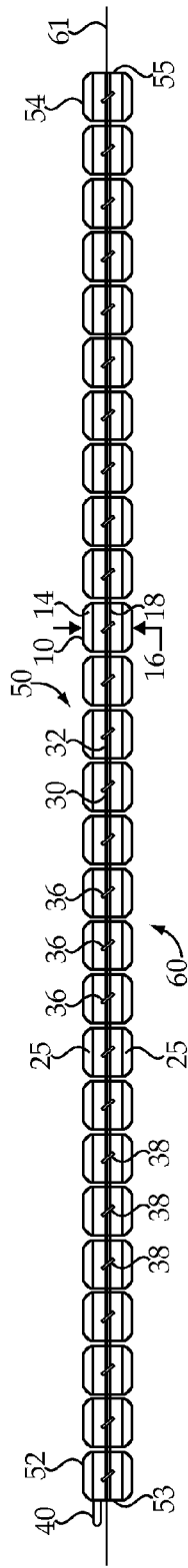
Fig.1
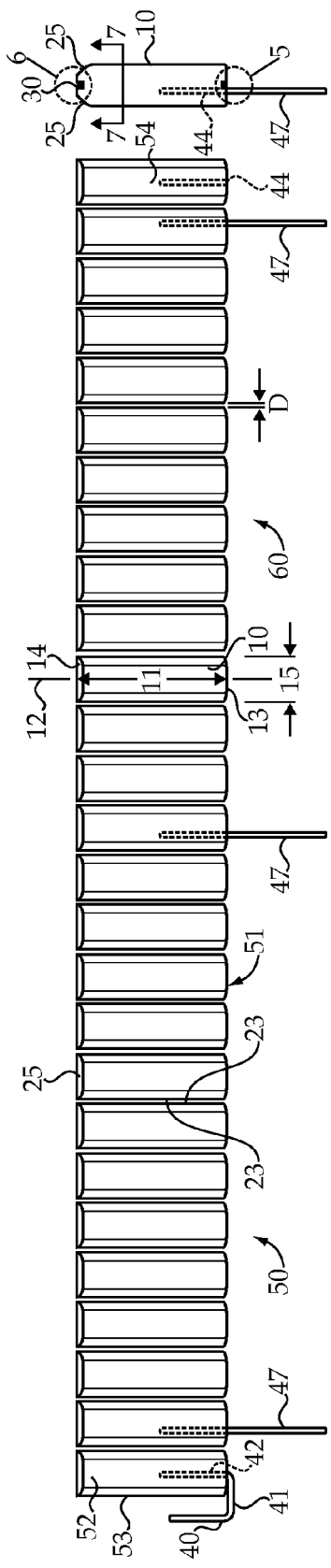
Fig.2
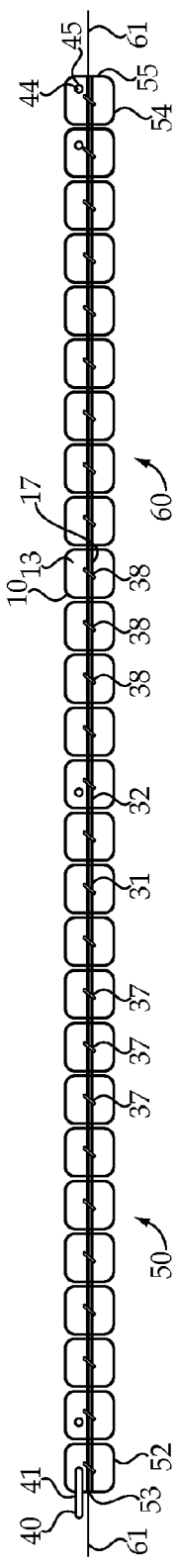
Fig.3
Fig.4

LANDSCAPING BORDER SEGMENT

TECHNICAL FIELD

The present disclosure relates generally to landscaping borders, and more particularly to landscaping border segments that can be joined in series to define a landscaping border.

BACKGROUND

Landscapers often desire a look that defines a clear separation between different areas. For instance, landscaping borders are often utilized to separate mulched areas from grass lawn areas. Because these borders between the different areas often include curves of various radiuses in different directions, it can sometimes be difficult to find a suitable medium in order to construct an attractive landscaping border. Canadian Patent No. CA 2667630 shows an example landscaping border segment in which individual wooden pieces that make up the landscaping border segment are attached with staples. While such a strategy permits some flexibility in forming the landscaping border segment to adapt to different curvatures, it has limited capability due to the rigid nature of the attaching staples.

The present disclosure is directed toward one or more of the problems set forth above.

SUMMARY

In one aspect, a landscaping border segment includes a rigid unit piece with a height along an axis between a base end and a top end that is greater than both a width and depth. The base end defines a base groove oriented perpendicular to the axis, and the top end defines a top groove oriented perpendicular to the axis and parallel to the base groove. About two dozen of the rigid unit pieces are arranged in a series with the axes in parallel and with the bases defining a ground contact surface. The series includes a left end rigid unit piece that defines a left end of the series, and a right end rigid unit piece that defines a right end of the series. One of the left end rigid unit piece and the right end rigid unit piece has a male connection feature, and an other of the left end rigid unit piece and the right end rigid unit piece has a female connection feature that mates to the male connection feature. A top elastic elongate joining member is received in each of the top grooves. A base elastic elongate joining member is received in each of the base grooves. A top fastener is mounted in the top end of each of the rigid unit pieces and is positioned to affix the top elastic elongate member to the respective rigid unit piece. A base fastener is mounted in the base end of each of the rigid unit pieces and is positioned to affix the base elastic elongate member to the respective rigid unit piece. A plurality of ground penetrating stakes extend away from the ground contact surface, and each is mounted to a different one of the rigid unit pieces. Adjacent rigid unit pieces are held apart by the top and base elastic elongate joining members when the series is in a straight configuration at which the axes lie in a plane, and the series has a continuum of curved configurations in which different adjacent pairs of rigid unit pieces rotate relative to each other while all the axes remain parallel in each of the straight and curved configurations. The top and base elongate joining members are stretched in at least one of the curved configurations.

In another aspect, a landscaping border includes a plurality of identical landscaping border segments connected end to end.

In still another aspect, a sale presentation of landscaping border segments includes a pallet with a stack of layers that each include a plurality of identical landscaping border segments that are in a straight configuration. Each of the layers is orthogonal to a contiguous layer.

BRIEF DESCRIPTION OF THE DRAWINGS

FIG. 1 is a top view of a landscaping border segment according to the present disclosure in a straight configuration;

FIG. 2 is a front view of the landscaping border segment of FIG. 1;

FIG. 3 is a bottom view of the landscaping border segment of FIGS. 1 and 2;

FIG. 4 is a right end view of the landscaping border segment of FIGS. 1-3;

DETAILED DESCRIPTION

Figure 5:
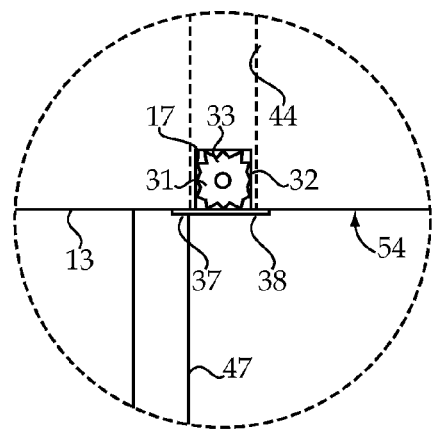
FIG. 5 is an enlarged view of a portion of the right end rigid unit piece of the landscaping border segment of FIGS. 1-4, corresponding to the area 5 in FIG. 4.
Figure 6:
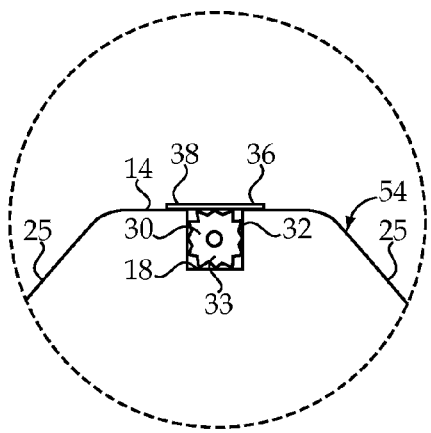
FIG. 6 is an enlarged view of a portion of the right end rigid unit piece of the landscaping border segment of FIGS. 1-4, corresponding to the area 6 shown in FIG. 4.

Referring initially to FIGS. 1-7, a landscaping border segment 50 includes about two dozen rigid unit pieces 10 arranged in a series. Each rigid unit piece 10 has a height 11 along an axis 12 between a base end 13 and a top end 14 that is greater than both a width 15 and a depth 16. The base end defines a base groove 17 oriented perpendicular to the axis 12, and the top end defines a top groove 18 oriented perpendicular to the axis 12 and parallel to the base groove 17. Each rigid unit piece 10 may be made from wood that may or may not include a preservative treatment, but other materials, such as plastic, could be utilized without departing from the intended scope of the present disclosure. Thus, in the case of rigid unit pieces 10 being manufactured from wood, one could expect each rigid unit piece to expand and contract responsive to moisture content. Although not required, in the illustrated embodiment, each of the rigid unit pieces has an identical shape, but landscaping border segments 50 made up of rigid unit pieces 10 having two or more different individual shapes could also fall within the intended scope of the present disclosure. As stated earlier, about two dozen of the rigid unit pieces 10 are arranged in a series with the axes 12 in parallel, and with the base ends 13 defining a ground contact surface 51. In addition, the series includes a left end rigid unit piece 52 that defines a left end 53 of the series, and a right end rigid unit piece 54 that defines a right end 55 of the series. As used in this disclosure, the term "about" means rounded to a single significant digit. For instance, landscaping border segments 50 that include anywhere from eighteen to thirty rigid unit pieces 10 could be thought of as including about two dozen rigid unit pieces according to the present disclosure. In practice, each landscaping border segment 50 can be made in uniform lengths of maybe about thirty inches each, but other lengths would also fall within the scope of this disclosure.

One of the left end rigid unit piece 52 and the right end rigid unit piece 54 has a male connection feature 40, and an other of the left end rigid unit piece 52 and right end rigid unit piece 54 has a female connection feature 44 that mates to the male connection feature 40. In the illustrated embodiment, the male connection feature 40 includes a U-shaped rod 41 of a medium diameter with one leg 42 pressfit into a small diameter bore defined by the left end rigid unit piece 52. The female connector 44 includes a large diameter bore 45 defined by the right end rigid unit piece 54, with the large diameter bore 45 being oriented parallel to the axis 12. Those skilled in the art will appreciate that the male and female connection features 40,44 could take different forms, and could be located on opposite ends of the landscaping border segment 50 apart from the configuration shown without departing from the intended scope of the present disclosure.

A top elastic elongate joining member 30 is received in each of the top grooves 18 of the rigid unit pieces 10. Likewise, a base elongate joining member 31 is received in each of the base grooves 17 of the rigid unit pieces 10. In the illustrated embodiment, the elastic elongate joining members 30, 31 are segments of screen spline 32 with a cross section 33 that is deformed when received in the top and base grooves 17, 18, respectively. For instance, screen spline 32 may have a hollow center and a star shaped outer perimeter that deforms when pressed into the grooves 17, 18.

A top fastener 36 is mounted in the top end 14 of each of the rigid unit pieces 10 and is positioned to affix the top elastic elongate member 30 to the respective rigid unit piece 10. Likewise, a base fastener 37 is mounted in the base end 13 of each of the rigid unit pieces 10 and is positioned to affix the base elastic elongate joining member 31 to the respective rigid unit piece 10. In the illustrated embodiment, the top and base fasteners 36, 37 may take the form of identical staples 38 that straddle the respective top and base elastic elongate joining members 30, 31.

A plurality of ground penetrating stakes 47 extend away from the ground contact surface 51, with each of the ground penetrating stakes 47 being mounted to a different one of the rigid unit pieces 10. The ground penetrating stakes 47 may take the form of rigid metallic rods that are pressfit into respective bores of the rigid unit pieces 10. Although ground contact surface 51 is shown as defining a plane, a ground contact surface 51 that is curved or otherwise not planar would also fall within the intended scope of the present disclosure.

Figure 11:
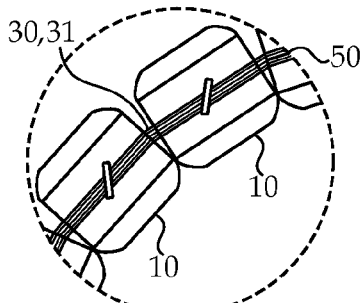
FIG. 11 is a close up view of two adjacent rigid unit pieces of a landscaping border segment with the elastic elongate joining member being stretched as per the area 11 of FIG. 10.
Figure 12:
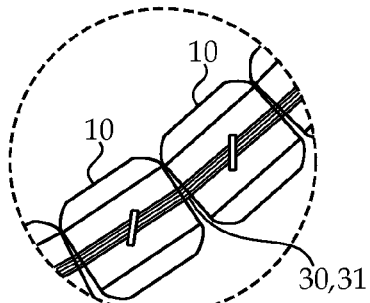
FIG. 12 is an enlarged view of two adjacent rigid unit pieces for a landscaping border segment according to the present disclosure when forming a curve without stretching the elastic elongate joining member as per area 12 of FIG. 12.

Adjacent rigid unit pieces 10 in each landscaping border segment 50 are held apart by the top and base elastic elongate joining members 30, 31 when the series in a straight configuration 60, as shown, at which the axes 12 all lie in a plane 61. Referring additionally to FIGS. 11-13, the series of rigid unit pieces 10 that make up a landscaping border segment 50 have a continuum of curved configurations 64 in which different adjacent pairs of rigid unit pieces 10 rotate relative to each other while all the axes 12 remain parallel in each of the straight 60 and curved configurations 64. When the curvature is substantial, the top and basic base elastic elongate joining members 30, 31 are stretched in at least one of the curved configurations 64, as shown in FIG. 12. For instance, when the landscaping border segment is formed into a curved configuration 64 in which the male and female connectors 40, 44 are joined to each other, the elastic elongate joining members 30, 31 will stretch. On the other hand, when the curvature is more relaxed, as shown in the enlargement of FIG. 13, the elastic elongate joining member 30, 31 need not stretch because the adjacent rigid unit pieces 10 can rotate relative to one another because they are held slightly spaced apart in the straight configuration as shown in FIGS. 1-3. The distance D that the adjacent rigid unit pieces are held apart may be on the order of about 1-2 mm. In the embodiment shown, adjacent rigid unit pieces 10 have planar surfaces 23 in opposition to each other, in parallel with each other, and perpendicular to the plane 61 in the straight configuration 60.

Figure 7:
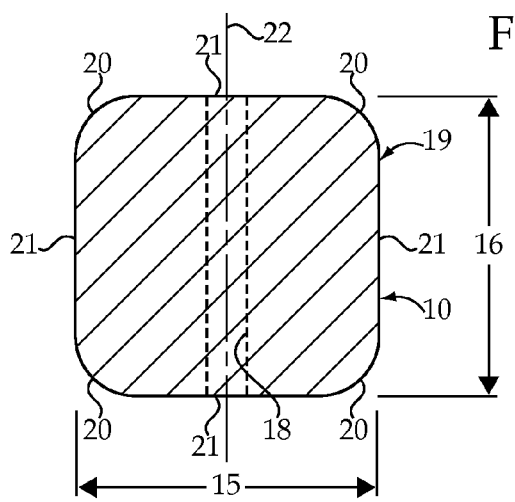
FIG. 7 is a sectioned view of the right end rigid unit piece as viewed along section lines 7-7 of FIG. 4.
Figure 8:
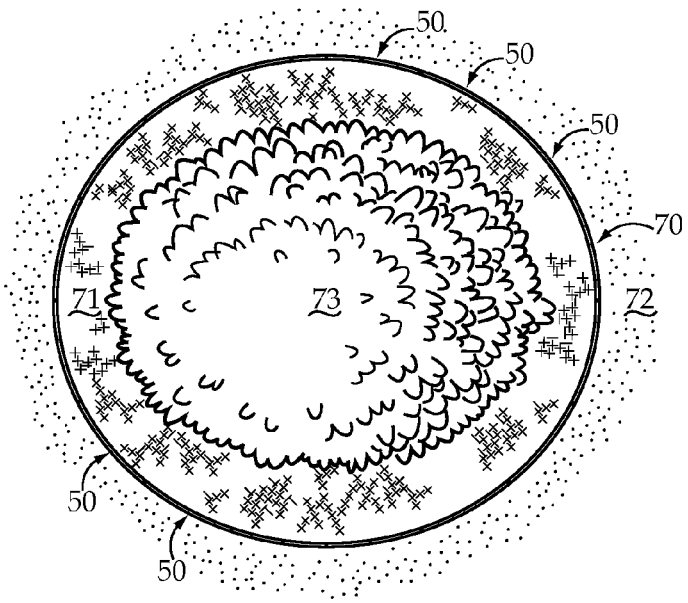
FIG. 8 is a top view of a landscaping border made up of a plurality of landscaping border segments according to the present disclosure.

As best shown in FIG. 7, each of the rigid unit pieces 10 has a cross section 19 that is a square shape with rounded corners 20 that separate flats 21 (includes planar surfaces 23). Preferably, but not necessarily, each of the rigid unit pieces 10 has a width 15 equal to a depth 16, and is symmetrical about a width plane 22 that bisects the top groove 18 and the base groove 17, and may also be symmetrical about a plane perpendicular to width plane 22. Pieces 10 may include bevels 25 that flank top groove 18 as best shown in FIG. 4.

INDUSTRIAL APPLICABILITY

The present disclosure finds potential applicability in the construction of landscaping borders. In particular, the present disclosure finds specific applicability to landscaping border segments that may be joined together end-to-end to define a landscaping border. The present disclosure also finds specific application to accommodating irregular curvatures that might be desirable to landscaping experts in constructing a landscaping border.

Figure 9:
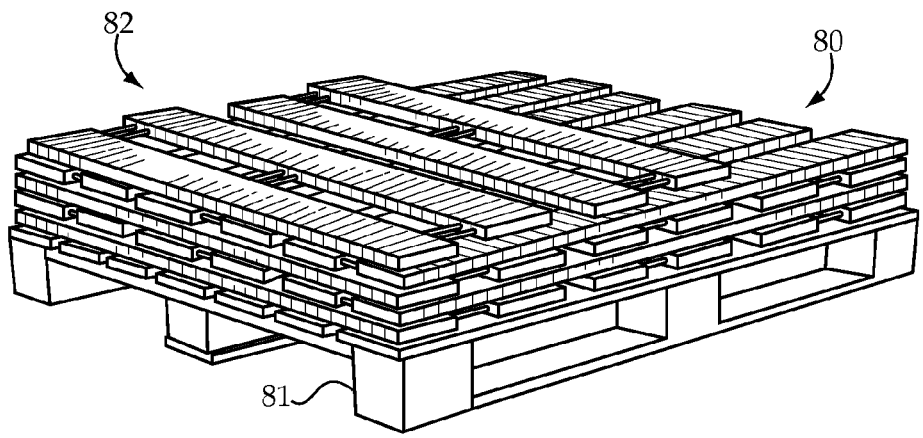
FIG. 9 is a perspective view of a sale presentation of landscaping border segments according to another aspect of the present disclosure.

Referring to FIG. 9, an example landscaping border 70 includes a plurality of identical landscaping border segments 50 connected end-to-end. In this specific example, the landscaping border segments are joined in a closed circular configuration to separate a mulch area 71 from a grass area 72. A tree 73 may be located in the mulch area 71.

Figure 10:
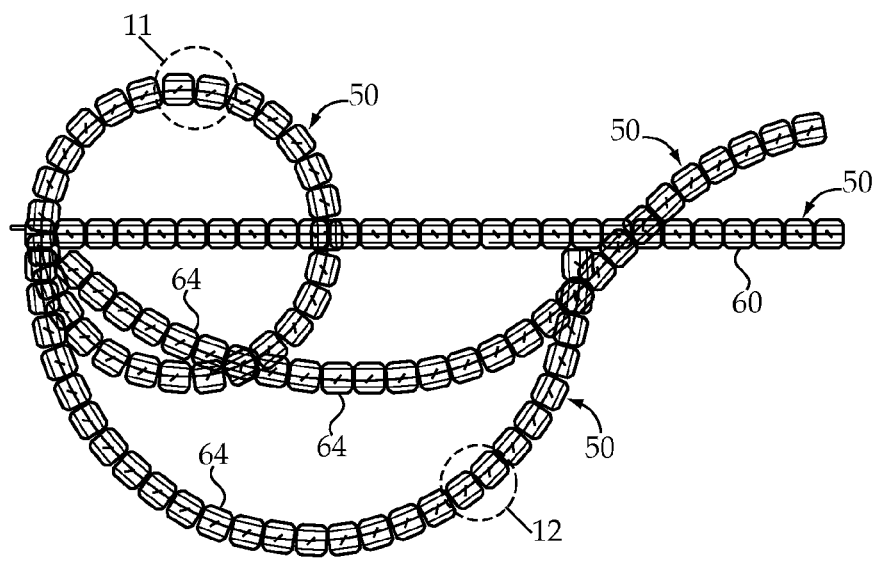
FIG. 10 is a top schematic view showing different configurations for a landscaping border segment according to the present disclosure.

Referring now in addition to FIG. 10, a sale presentation 80 of landscaping border segments 50 includes a pallet 81 with a stack of layers 82. Each layer 82 includes a plurality of identical landscaping border segments 50 that are in a straight configuration 60. Each of the layers 82 is oriented orthogonal to a contiguous layer.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A landscaping border segment comprising:
a rigid unit piece with a height along an axis between a base end and a top end that is greater than both a width and depth, and the base end defining a base groove oriented perpendicular to the axis, and the top end defining a top groove oriented perpendicular to the axis and parallel to the base groove;
about two dozen of the rigid unit pieces arranged in series with the axes in parallel and with the base ends defining a ground contact surface, and a left end rigid unit piece defines a left end of the series, and a right end rigid unit piece defines a right end of the series;
one of the left end rigid unit piece and the right end rigid unit piece having a male connection feature, and an other of the left end rigid unit piece and the right end rigid unit piece having a female connection feature that mates to the male connection feature;
a top elastic elongate joining member received in each of the top grooves;
a base elastic elongate joining member received in each of the base grooves;
a top fastener mounted in the top end of each of the rigid unit pieces and being positioned to affix the top elastic elongate joining member to the respective rigid unit piece;
a base fastener mounted in the base end of each of the rigid unit pieces and being positioned to affix the base elastic elongate joining member to the respective rigid unit piece;
a plurality of ground penetrating stakes extending away from the ground contact surface, and each being mounted to a different one of the rigid unit pieces;
adjacent rigid unit pieces being held apart by the top and base elastic elongate joining members when the series is in a straight configuration at which the axes lie in a plane, and the series having a continuum of curved configurations in which different adjacent pairs of rigid unit pieces rotate relative to each other while all the axes remain parallel in each of the straight and curved configurations; and
the top and base elastic elongate joining members being stretched in at least one of the curved configurations.

2. The landscaping border segment of claim 1 wherein each of the rigid unit pieces has a cross section that is a square shape with rounded corners that separate flats.

3. The landscaping border segment of claim 1 wherein each rigid unit piece has the width equal to the depth, and is symmetrical about a width plane that bisects the top groove and the base groove.

4. The landscaping border segment of claim 1 wherein the top and base elastic elongate joining members are segments of screen spline with a cross section that is deformed when received in the top and base grooves, respectively.

5. The landscaping border segment of claim 1 wherein each rigid unit piece has an identical shape that expands and contracts responsive to moisture content.

6. The landscaping border segment of claim 1 wherein the male connector is mated to the female connector in one of the curved configurations.

7. The landscaping border segment of claim 1 wherein each of the top and base fasteners are identical staples that straddle the respective top and base elastic elongate joining members.

8. The landscaping border segment of claim 1 wherein ground contact surface is a plane.

9. The landscaping border segment of claim 1 wherein adjacent rigid unit pieces have planar surfaces in opposition to each other, in parallel with each other, and perpendicular to the plane in the straight configuration.

10. The landscaping border segment of claim 1 wherein the female connector includes a large diameter bore defined by one of the left and right end rigid unit pieces, and oriented parallel to the axes;
the male connector includes a rigid U-shaped rod of medium diameter with one leg press fit into a small diameter bore defined by an other of the left and right end rigid unit pieces.

11. The landscaping border segment of claim 1 wherein each of the rigid unit pieces has a cross section that is a square shape with rounded corners that separate flats, and each rigid unit piece has the width equal to the depth, and is symmetrical about a width plane that bisects the top groove and the base groove;
the top and base elastic elongate members are segments of screen spline with a hollow star shaped cross section that is deformed when received in the top and base grooves, respectively;
wherein the female connector includes a large diameter bore defined by one of the left and right end rigid unit pieces, and oriented parallel to the axes;
the male connector includes a rigid U-shaped rod of medium diameter with one leg press fit into a small diameter bore defined by an other of the left and right end rigid unit pieces.

12. The landscaping border segment of claim 11 wherein each rigid unit piece has an identical shape that expands and contracts responsive to moisture content;
the male connector is mated to the female connector in one of the curved configurations; and
each of the top and base fasteners are identical staples that straddle the respective top and base elastic elongate members.

13. A landscaping border comprising:
plurality of identical landscaping border segments connected end to end, and each of the landscaping border segments including:
a rigid unit piece with a height along an axis between a base end and a top end that is greater than both a width and depth, and the base end defining a base groove oriented perpendicular to the axis, and the top end defining a top groove oriented perpendicular to the axis and parallel to the base groove;
about two dozen of the rigid unit pieces arranged in series with the axes in parallel and with the base ends defining a ground contact surface, and a left end rigid unit piece defines a left end of the series, and a right end rigid unit piece defines a right end of the series;
one of the left end rigid unit piece and the right end rigid unit piece having a male connection feature, and an other of the left end rigid unit piece and the right end rigid unit piece having a female connection feature that mates to male connection feature;
a top elastic elongate joining member received in each of the top grooves;
a base elastic elongate joining member received in each of the base grooves;
a top fastener mounted in the top end of each of the rigid unit pieces and being positioned to affix the top elastic elongate joining member to the respective rigid unit piece;

a base fastener mounted in the base end of each of the rigid unit pieces and being positioned to affix the base elastic elongate joining member to the respective rigid unit piece;

a plurality of ground penetrating stakes extending away from the ground contact surface, and each being mounted to a different one of the rigid unit pieces;

adjacent rigid unit pieces being held apart by the top and base elastic elongate joining members when the series is in a straight configuration at which the axes lie in a plane, and the series having a continuum of curved configurations in which different adjacent pairs of rigid unit pieces rotate relative to each other while all the axes remain parallel in each of the straight and curved configurations; and the top and base elastic elongate joining members being stretched in at least one of the curved configurations.

14. The landscaping border of claim 13 wherein each of the rigid unit pieces has a cross section that is a square shape with rounded corners that separate flats, and each rigid unit piece has the width equal to the depth, and is symmetrical about a width plane that bisects the top groove and the base groove;

the top and base elastic elongate members are segments of screen spline with a hollow star shaped cross section that is deformed when received in the top and base grooves, respectively;

wherein the female connector includes a large diameter bore defined by one of the left and right end rigid unit pieces, and oriented parallel to the axes;

the male connector includes a rigid U-shaped rod of medium diameter with one leg press fit into a small diameter bore defined by an other of the left and right end rigid unit pieces.

15. The landscaping border of claim 14 wherein each rigid unit piece has an identical shape that expands and contracts responsive to moisture content;

the male connector is mated to the female connector in one of the curved configurations; and each of the top and base fasteners are identical staples that straddle the respective top and base elastic elongate joining members.

16. A sale presentation of landscaping border segments comprising:

a pallet with a stack of layers that each include a plurality of identical landscaping border segments that are in a straight configuration, and each of the layers being orthogonal to a contiguous layer, and each of the landscaping border segments including a rigid unit piece with a height along an axis between a base end and a top end that is greater than both a width and depth, and the base end defining a base groove oriented perpendicular to the axis, and the top end defining a top groove oriented perpendicular to the axis and parallel to the base groove;

about two dozen of the rigid unit pieces arranged in series with the axes in parallel and with the base ends defining a ground contact surface, and a left end rigid unit piece defines a left end of the series, and a right end rigid unit piece defines a right end of the series;

one of the left end rigid unit piece and the right end rigid unit piece having a male connection feature, and an other of the left end rigid unit piece and the right end rigid unit piece having a female connection feature that mates to male connection feature;

a top elastic elongate joining member received in each of the top grooves;

a base elastic elongate joining member received in each of the base grooves;

a top fastener mounted in the top end of each of the rigid unit pieces and being positioned to affix the top elastic elongate joining member to the respective rigid unit piece;

a base fastener mounted in the base end of each of the rigid unit pieces and being positioned to affix the base elastic elongate joining member to the respective rigid unit piece;

a plurality of ground penetrating stakes extending away from the ground contact surface, and each being mounted to a different one of the rigid unit pieces;

adjacent rigid unit pieces being held apart by the top and base elastic elongate joining members when the series is in the straight configuration at which the axes lie in a plane, and the series having a continuum of curved configurations in which different adjacent pairs of rigid unit pieces rotate relative to each other while all the axes remain parallel in each of the straight and curved configurations; and the top and base elastic elongate joining members being stretched in at least one of the curved configurations.

17. The sale presentation of landscaping border segments of claim 16 wherein each of the rigid unit pieces has a cross section that is a square shape with rounded corners that separate flats, and each rigid unit piece has the width equal to the depth, and is symmetrical about a width plane that bisects the top groove and the base groove;

the top and base elastic elongate joining members are segments of screen spline with a hollow star shaped cross section that is deformed when received in the top and base grooves, respectively;

wherein the female connector includes a large diameter bore defined by one of the left and right end rigid unit pieces, and oriented parallel to the axes;

the male connector includes a rigid U-shaped rod of medium diameter with one leg press fit into a small diameter bore defined by an other of the left and right end rigid unit pieces.

18. The sale presentation of landscaping border segments of claim 17 wherein each rigid unit piece has an identical shape that expands and contracts responsive to moisture content;

the male connector is mated to the female connector in one of the curved configurations; and each of the top and base fasteners are identical staples that straddle the respective top and base elastic elongate joining members.

19. The sale presentation of landscaping border segments of claim 18 wherein adjacent landscaping border segments in each of the layers have their respective ground penetrating stakes pointing toward each other.

* * * * *